Dec. 19, 1939.   J. H. ROBERTS   2,183,923
SPRING SHACKLE ASSEMBLY
Filed March 10, 1939
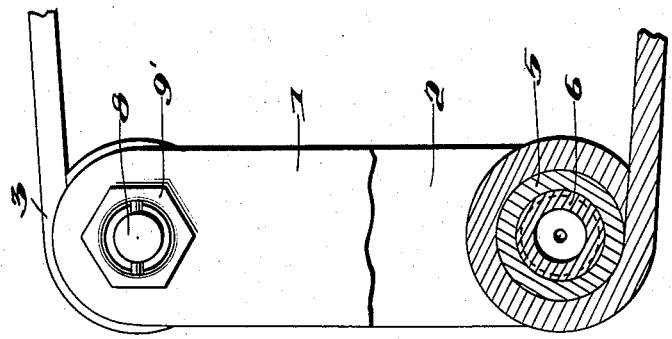
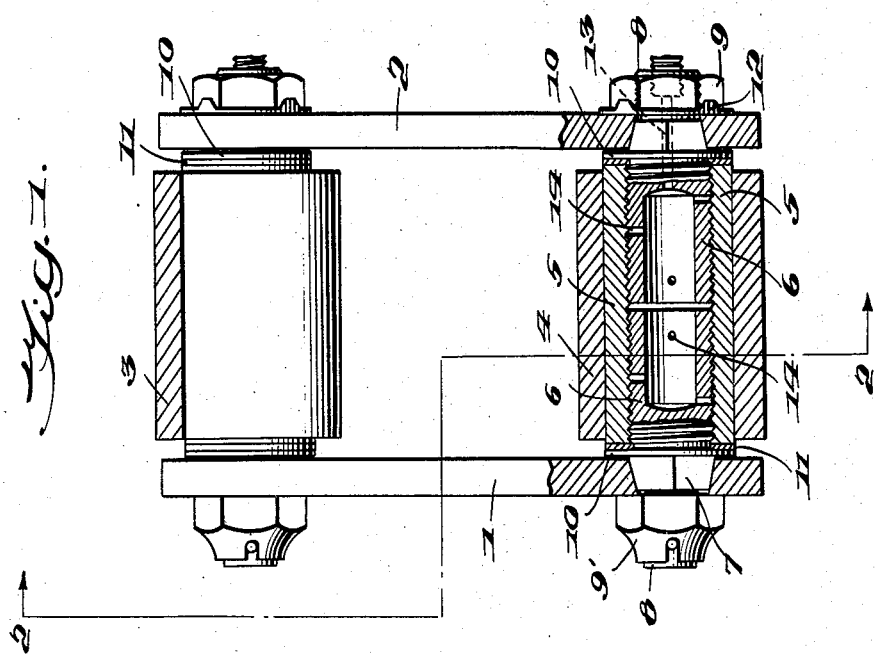
Inventor
James H. Roberts,
By Prevost & Prevost
Attorneys Patented Dec. 19, 1939

2,183,923

UNITED STATES PATENT OFFICE 2,183,923

SPRING SHACKLE ASSEMBLY

James H. Roberts, Osceola, Ark.

Application March 10, 1939, Serial No. 261,100

1 Claim. (Cl. 267—54)

My invention consists in new and useful improvements in spring shackles such as are generally employed in securing the springs of an automobile or the like to the chassis or frame of the vehicle.

I am familiar with the various conventional forms of shackle assemblies in use at present but experience has shown that in most instances these assemblies are faulty for the reason that the necessary relative movement of the shackle bars is not insured during a twisting or swaying movement of the vehicle. As a result of this strain either the bolts or shackle bars inevitably break in time, causing considerable inconvenience and expense for repairs.

It is therefore the primary object of the present invention to provide a shackle assembly which overcomes these disadvantages, and to this end I have designed an assembly of the threaded sleeve type which is so constructed that the parts are secured in place by pairs of oppositely disposed threaded members positively engaging the shackle bars but capable of a limited individual movement in the threaded sleeves as the respective shackle bars are subjected to relative displacement.

Another object of my invention resides in my improved mounting means which, while permitting a limited relative movement of the threaded sleeve and retaining members, prevents the elements from becoming unscrewed or separated.

A still further object of my invention is to provide an improved means for lubricating the shackle structure to facilitate the relative movement of the parts without binding, squeaking, or rattling.

With the above and other objects in view which will appear as the description proceeds, my invention resides in the novel features herein set forth, illustrated in the accompanying drawing and more particularly pointed out in the appended claim.

Referring to the drawing in which numerals of like character designate similar parts throughout both views, Fig. 1 is a plan view of my spring shackle assembly showing one end in section, and Fig. 2 is a sectional view taken on line 2—2 of Fig. 1.

In the drawing, 1 and 2 represent conventional shackle bars which extend between the eye of the hanger 3 on the automobile chassis and the eye of the spring 4. An internally threaded sleeve 5 fits closely within and extends slightly beyond each end of the eyes of the hanger 3 and spring 4, said sleeves being supported by means of oppositely disposed partially hollow screws or bolts 6 which are screwed into the sleeves 5 from each end and terminate with their inner extremities in slightly spaced relation. Each of these screws 6 is substantially solid at one end which is provided with a tapered square or chamfered portion 7 adapted to fit in complementary openings in the respective shackle bars 1 and 2, the ends of said screws beyond said chamfered portion being reduced and threaded as at 8 to project through the respective shackle bars.

The shackle bars are held in place preferably by employing nuts 9 and cooperating clip washers 12 on one side, and on the other side by conventional nuts 9' locked in place by cotter pins. Adjacent the inner face of the shackle bars, the screws 6 are provided with flanges or shoulders 10 which extend radially for substantially the thickness of the sleeve 5, said flanges serving as abutments for washers 11 of cork or other suitable material which may be interposed adjacent the ends of the sleeves 5 to exclude foreign matter and retain lubricant, as will hereinafter appear.

The solid threaded end of one of the screws 6 of each pair is drilled longitudinally as at 13 to the hollow portion and adapted to receive a fitting whereby a grease gun may be applied to fill the hollow portions of the screws with a suitable lubricant, a series of radial ports 14 being provided through the walls of the screws 6 placing the lubricating chamber in communication with the threads on the sleeve and screws.

In assembling this device, sleeves 5 are inserted in the eyes of both the chassis hanger and the spring. Screws 6 are then screwed into the opposite ends of the sleeves with washers 11 interposed between the shoulders 10 and adjacent ends of the sleeves, and the shackle bars 1 and 2 are mounted with their squared openings in engagement with the respective squared portions 7 of the screws 6. Nuts 9 and 9' are then applied to the reduced threaded portions 8 on the screws 6 to lock the assembly in place. Suitable lubricant is forced into the grease chamber through the bore 13 in the usual manner.

Thus, as the springs of the vehicle function, the screws 6 will oscillate to some extent in the threads of the sleeve 5, but due to the engagement of the squared portions 7 with the complementary openings in the shackle bars, the screws 6 are prevented from rotating and working out of the sleeve which has been a prevalent source of trouble with the conventional sleeve-type spring shackle. During this oscillation, lubricant will be fed and distributed around the threads of the screws and sleeve, thus preventing binding and providing a long wearing, quiet and efficient shackle assembly. The leakage of lubricant past the ends of the sleeves 5 is prevented by the tight engagement of the washers 11 between the ends of the sleeves and the shoulders 10.

It will be apparent that with this improved structure, I have provided a shackle assembly which, while affording a firm and positive engagement of the shackle bars between the nuts 9 and shoulders 10 of respective screws 6, permits a sufficient degree of flexibility between adjacent shackle bars through the pairs of relatively movable screws 6, to compensate for the twisting and swaying of the moving vehicle.

It will be further observed that the portion of each screw 6 which is subjected to strain, that is, the outer end of each screw which supports the shackle bars, is practically solid, thereby providing increased strength at the point requiring the greatest support. Furthermore, due to the structure of the screw members 6, it is not necessary to employ specially constructed shackle bars.

From the foregoing it is believed that the construction and advantages of my shackle assembly may be readily understood by those skilled in the art without further description, it being borne in mind that numerous changes may be made in the details disclosed without departing from the spirit of my invention as set out in the following claim.

What I claim and desire to secure by Letters Patent is:

In a spring shackle assembly for connecting a spring to the hanger of a vehicle chassis, including a pair of shackle bars, and internally threaded sleeves engaging the eyes of the spring and hanger, respectively; means for securing said shackle bars to respective sleeves, comprising a pair of oppositely disposed threaded members cooperating with and independently movable in the threads of each of said sleeves, the opposed inner ends of said threaded members being hollowed to form a grease chamber, said threaded members being provided with a series of radial ports for placing said chamber in communication with the threads of said threaded members and said sleeve, a circular flange on the outer end of each of said threaded members integral with the latter, said flanges being interposed between said sleeve and respective shackle bars, means for fixedly mounting the outer end of each of said threaded members on the adjacent end of said shackle bars in abutting engagement with said flanges, means for injecting grease in the outer end of at least one threaded member of each pair, and sealing means interposed between each of said flanges and the respective end of said sleeve for preventing the escape of grease lubricant along the outer ends of said threaded members.

JAMES H. ROBERTS.